No. 727,439. PATENTED MAY 5, 1903.
F. PRINZ.
DUST COLLECTOR.
APPLICATION FILED FEB. 21, 1902.
NO MODEL. 2 SHEETS—SHEET 1.

Witnesses Inventor

No. 727,439. PATENTED MAY 5, 1903.
F. PRINZ.
DUST COLLECTOR.
APPLICATION FILED FEB. 21, 1902.
NO MODEL. 2 SHEETS—SHEET 2.

Witnesses

Inventor

No. 727,439. Patented May 5, 1903.

UNITED STATES PATENT OFFICE.

FAUSTIN PRINZ, OF MILWAUKEE, WISCONSIN.

DUST-COLLECTOR.

SPECIFICATION forming part of Letters Patent No. 727,439, dated May 5, 1903.

Application filed February 21, 1902. Serial No. 95,113. (No model.)

*To all whom it may concern:*

Be it known that I, FAUSTIN PRINZ, a citizen of the United States, residing at Milwaukee, in the county of Milwaukee and State of Wisconsin, have invented certain new and useful Improvements in Dust-Collectors; and I do declare the following to be a full, clear, and exact description of the invention, such as will enable others skilled in the art to which it appertains to make and use the same, reference being had to the accompanying drawings, and to the figures of reference marked thereon, which form a part of this specification.
My invention relates to dust-collectors, and more particularly to that type consisting of a rotary reel comprising a number of tubes opening at their inner ends into a central chamber or drum in which the dust-laden air is received and from which it passes into the tubes from the surfaces of which the dust is dislodged and deposited in a cut-off chamber or trough which shuts off communication between the central chamber or drum and the tubes from which the dust is being dislodged.

The invention has for its object to provide improved means for dislodging the dust from the tubes, also to provide improved means for supporting the tubes, also to provide an improved construction of the central chamber or drum, and also to provide a machine of the character indicated which will be simple in its construction, comparatively inexpensive to build and at the same time efficient in its operation and results to be accomplished; and it has also for its object to provide other improved features which will be made to hereinafter appear.

To the accomplishment of the foregoing and such other objects as may be made to appear the invention consists in the features hereinafter particularly described and then sought to be clearly defined, reference being had to the accompanying drawings, forming a part hereof; in which—

Figures 1, 2, 3, 4, 8, 9:
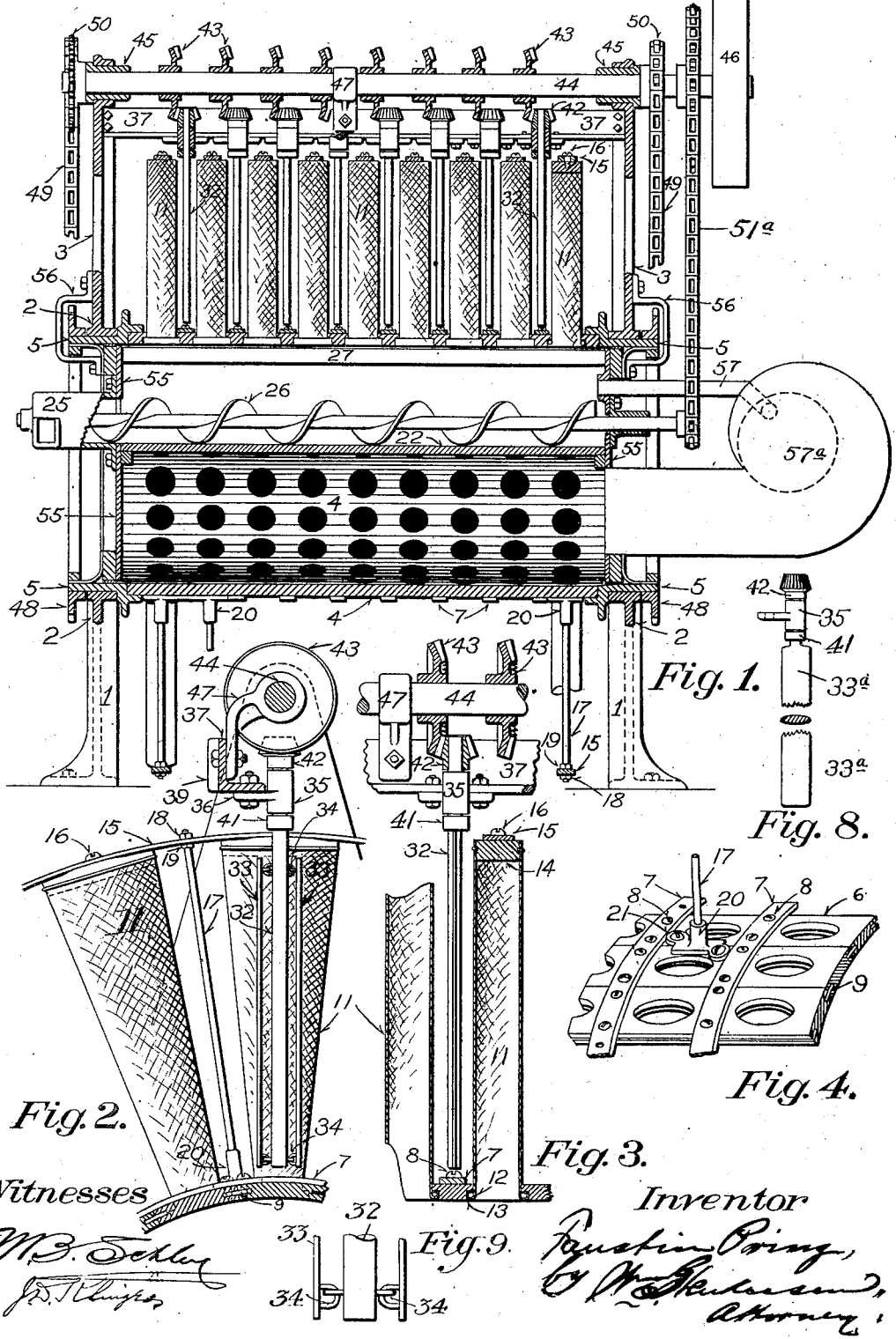
Figure 5:
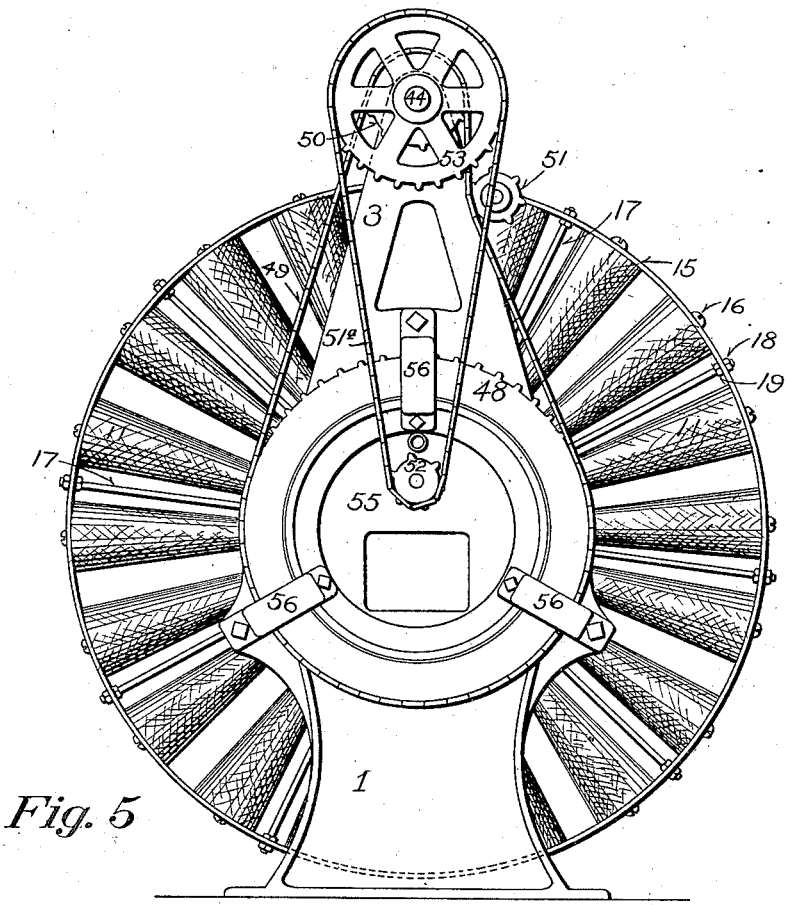
Figure 6:
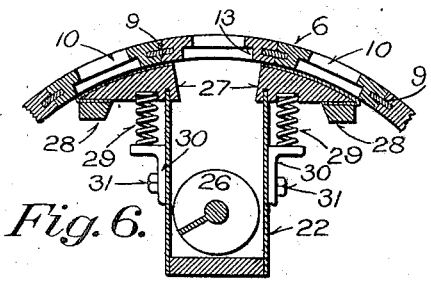
Figure 7:
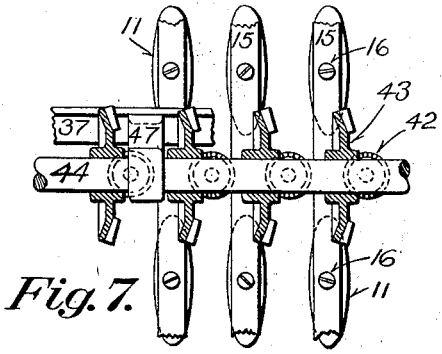

Figure 1 is a vertical section through a dust-collector containing features of my invention with parts broken away and other parts omitted. Fig. 2 is a transverse section through a part of the machine. Fig. 3 is a detail view, partly in section, of some of the parts. Fig. 4 is a detail perspective of a part of the drum. Fig. 5 is an end elevation of the machine. Fig. 6 is a section through a part of the drum and cut-off trough. Fig. 7 is a detail plan of a portion of the collector. Fig. 8 is a side view of a modified form of beater with a portion in section, and Fig. 9 is a detail view of the connection between the beaters and their rotating shaft on an enlarged scale.

In the drawings, the numeral 1 designates standards provided with annular rings 2, from which rise bracket-arms 3, and between the rings 2 there is sustained a chamber or drum 4, which is provided at opposite ends with rims 5, which have their bearings in the rings 2, so that the drum will be free to rotate. The drum is preferably made up of a series of longitudinally-extending staves 6, the ends of the staves being suitably secured to the rims 5, and around the drum at suitable distances apart are passed bands 7, of metal or other suitable material, which will be secured to the staves preferably by means of screws 8, passed through the bands and into the staves, thus forming a very strong and durable drum, and the bands serving to prevent separation of the staves between the ends of the drum. To guard against any possible leakage at the joints between the staves occasioned by shrinkage of the wood from which the staves are made, I form a groove in the edge of each stave and insert in the adjacent grooves a tongue or strip 9, made, preferably, of metal, or which may be of other suitable material, so that if shrinkage occurs this filling-strip will keep the joint closed, so that there can be no escape of dust from the drum through the joints. Each stave is formed with a number of openings 10, and from the outside of the drum extend a number of tubes 11, which are formed of suitable porous fibrous material, the inner end of each tube fitting over one of the openings 10 in the periphery of the drum and being secured to the drum by means of rings 12, secured to the ends of the tubes and fitting in recesses 13, formed in the staves around the openings 10 or otherwise secured to the drum, while the outer ends of the tubes are closed by solid heads 14, of wood or other suitable material, which preferably are of elongated form, so as to impart a corresponding shape to the upper portions of the tubes, although they may be of other form, and the tubes are preferably of greater diameter toward the upper ends than at the base. While these are the preferred details of construction of the tubes and the manner of securing them to the drum, yet they may be otherwise formed and secured. These tubes, which constitute pockets for receiving dust-laden air from inside of the chamber or drum 4, are connected one to the other in a direction around the drum by hoops or bands 15, which are secured to the heads of the tubes by means of screws 16 or otherwise, and the tubes are supported by means of rods 17, which at their upper ends pass through the hoops 15 at points between the tubes and are secured thereto by means of nuts 18 and 19, while at their lower ends the rods are stepped or seated in sockets or studs 20, which rise from base-plates 21, screwed or otherwise secured to the periphery of the drum. These base-plates carrying the studs are preferably so located that they will overlap the joints between the staves, so that they may be secured to the staves on both sides of the joints, so that the holding-screws can pass into the tongues or filling-strips, as well as through the staves, and thus get a firmer hold and also serve to hold the strips, a detail showing the manner of placing the base-plates being found in Fig. 4 of the drawings.

Within the chamber or drum 4 is located a trough 22, which discharges at one end through a spout 25, and within the trough is a conveyer 26. At the upper end of the trough and projecting beyond opposite sides thereof are wings 27, which permit communication between certain of the tubes and the trough as the tubes pass over the trough and which cut off communication of said tubes and trough with the other tubes and with the interior of the drum. These wings at their outer ends may rest upon bars 28 and are grooved on their under faces, so as to receive the upper edges of the sides of the trough 22 and are pressed upwardly by means of springs 29, which enter recesses formed in the wings and at their lower ends bear upon adjustable brackets 30, secured by bolts 31 to the sides of the trough, so that by adjustment of the brackets the springs may bear with more or less pressure against the wings, and thus hold the wings by a yielding pressure regulated by the adjustment of the brackets. The faces of the wings next to the tubes may be covered with any suitable packing material, and, if desired, such material may also be placed where the wings rest upon the bars 28, so as to form close joints at such points. As the tubes are brought in succession over the conveyer-trough they are subjected to a knocking operation, so as to dislodge the dust from their interior walls into the conveyer-trough. For that purpose I provide centrifugal beaters consisting of rotary shafts 32, provided with strips 33, suspended therefrom by means of staples 34 or other suitable means, so that when the shafts are rotated the strips will be thrown out from the same by centrifugal force, so as to contact with the tubes as they pass over the conveyer-trough, and thus dislodge the dust which has accumulated on the inner surface of the tubes. As illustrated, these shafts are suspended between the tubes at a point above the conveyer-trough and by means of sleeves or collars 35, provided with flanges 36, bolted to one member of an L-shaped bracket 37, extending from one end of the machine to the other and supported by being bolted to flanges 39, which extend inwardly from the bracket-arms 3. The shafts 32 are free to rotate in the sleeves 35 and are held therein by collars 41, secured to the shaft below the sleeve and by, for instance, the hubs of pinions 42, and the shafts are rotated by some suitable means. The preferred means consists of pinions 42, secured to the upper ends of the shafts and meshing with gear-wheels 43, secured to a shaft 44, extending the length of the machine and supported in suitable boxes 45 and rotated by the belt-pulley 46, deriving its power from some suitable source. The shaft 44 may be braced throughout its length by brackets 47, bolted at suitable points to the bracket-support 37 and encircling the shaft by collars formed on the ends of the bracing-brackets 47. While I prefer the means described for rotating the beater-shafts, because the same affords a simple, strong, and efficient means for the purpose, yet other driving means may be employed and the advantages of the form of beaters described be obtained.

The drum 4, carrying the dust-collecting pockets, may be rotated either continuously or intermittently; but for purposes of illustration I have shown it as capable of continuous rotation by means of toothed wheels 48, secured to the ends of the rims 5, where they project beyond the outer faces of the bearing-rings 2 and from which toothed wheels sprocket-chains 49 extend to sprocket-wheels 50, connected to the driving-shaft 44, said sprocket-chains being held taut by means of idlers 51, suitably supported from the bracket-arms 3. The shaft of the conveyer 26 is shown as rotated by means of a sprocket-chain 51$^a$, connecting the sprocket-wheel 52 on the conveyer-shaft with a sprocket-wheel 53 on the drive-shaft 44. The heads 55 of the drum 4 are stationary and may be supported from the rings 2 by means of the brackets 56, and the dust-laden air is driven into the drum at either or both ends by suitable means through the head or heads of the drum, as usual.

At the time that the tubes are over the conveyer-trough and the dust is being dislodged and discharged therefrom into the trough the tubes over the trough are subjected to an air-draft, which aids in removing the dust from the sides of the tubes and delivering the same into the trough. This air-draft may be created in any suitable manner, and for that purpose I illustrate a pipe 57, which leads from the conveyer-trough and connects with a fan or other source of air-producing current. When this pipe connects with a fan, the fan serves to create the air-current and may also be the means for again discharging into the drum the particles of dust that may be drawn out of the conveyer-trough by the air-current. This fan may be the same fan $57^a$ that draws the dust-laden air in the first instance from its original source and which discharges it into the drum in order to free the air from the dust.

It will be observed that by having the shafts carrying the beaters extend down between the tubes the beaters can be extended a greater or less distance of the length of the shafts, so that if desired they may be made to contact practically with the whole or nearly the whole length of the tubes, so that the dust will be quickly dislodged from practically the whole length of the tubes by the contact of the beaters therewith instead of at one given point, and thus a better and quicker separation of the dust from the tubes may be obtained. While it is preferred to have the beaters connected with the shafts so that when they strike the tubes they will yield, and thus guard against possible injury to the tubes, yet this feature of having rotating beaters between the tubes is not in the broadest scope of this feature of the invention restricted to the beaters being attached to the shafts so as to have a yielding connection therewith or so as to be thrown out by centrifugal force. It will further be observed under this arrangement of beaters that as the tubes are moved along they are subjected to a quick succession of blows in the line of travel of the tubes, as well as transverse to the line of travel, so that a more effectual dislodgment of the dust from the tubes is obtained, and the life and efficiency of the tubes are thus increased by the gliding contact thus obtained. It will be further observed that while the blows of the beaters against the opposite sides of each tube are parallel with the direction of movement of the tubes, yet the blows on one side are in the opposite direction to the blows on the opposite side, and thus the pull on the vertical sides of the tubes which lie between the sides against which the blows are made is even, so that the dislodgment of the dust from those two intermediate sides is more effectual than would be the case if the gliding blows were in the same direction to each other, as in that case the pull would be mainly on one of the intermediate vertical sides, and hence the dislodgment of dust from the other intermediate side would not be so effectual; but while this is so, certain advantages resulting from my arrangement of beaters would be attained even though some of the beaters were rotated in an opposite direction to the others, and therefore I am not restricted to the beater-shafts all rotating in the same direction. It will also be observed that these beaters will operate to discharge their function whether the drum and its dust-collecting pockets is rotated intermittently or continuously. It is to be further noted that some of the beaters can be omitted, so that the beaters may be between only alternate rows of the tubular pockets, and thus cause the pockets to be struck on only one side, which obviously would be within the scope of the invention.

I have illustrated and described with particularity the preferred details of construction and arrangement of parts, as a machine so constructed is satisfactory in the working of its several parts; but it is to be understood that changes can be made in such details and yet essential features of my invention be employed to obtain the results in view. For instance, instead of making the beater-shaft 32 round and providing it with the beater-strips 33 I may make the shaft elliptical or flattened in cross-section, as indicated by the modified form $33^a$ of beater, as shown in Fig. 8 of the drawings. The dimensions of this beater-shaft $33^a$ will of course be such that it will contact with the sides of the dust-collecting tubes or pockets as the shaft is rotated. This is an instance of merely one change that can be made, and it is understood that changes can be made in other parts of the machine and the features of my invention still be retained.

While I have described this invention for use in dust-collectors intended more particularly for separating dust from dust-laden air in flour-mills, yet it is obvious that the same construction can be employed for purifying air by separating dust, dirt, or impurities therefrom in other places than in flour-mills, and that while I have described the dust-collecting pockets made of porous fibrous material, yet they may be made of other porous material suitable for the particular purpose for which the machine may be employed. The invention is the same whatever use be made of the machine.

Having described my invention and set forth its merits, what I claim is—

1. In an air-purifier, a series of radially-arranged rotatable collecting tubes or pockets, a centrally-located chamber or drum with which the pockets communicate at one end, a hoop or band passing circumferentially around and connected with a series of the tubes or pockets, and means for sustaining the hoop or band and through it the tubes or pockets, substantially as described.

2. In an air-purifier, a series of radially-arranged rotatable collecting tubes or pockets, a centrally-located chamber or drum with which the pockets communicate at one end, a hoop or band passing circumferentially around and connected with a series of the tubes or pockets, and supporting-rods extending between the tubes or pockets and connected at one end to the hoop or band and at the other end supported from the drum for sustaining the tubes or pockets, substantially as described.

3. In an air-purifier, a series of radially-arranged rotatable collecting tubes or pockets, a centrally-located chamber or drum with which the pockets communicate at one end, a hoop or band passing circumferentially around a series of the tubes or pockets, supporting-rods extending between the tubes or pockets and connected at one end with said hoop or band, and supports for the lower ends of said rods, said supports having a socketed connection with the rods and secured to the drum, substantially as described.

4. In an air-purifier, a series of radially-arranged rotatable collecting tubes or pockets, a centrally-located chamber or drum with which the pockets communicate at one end and formed of a series of staves, a hoop or band passing circumferentially around a series of the tubes or pockets, supporting-rods connected at one end with the said hoop or band, and supports for the lower ends of said rods, said supports lying on both sides of the joints between the staves and secured to the staves of the drum, substantially as described.

5. In an air-purifier, a series of radially-arranged collecting tubes or pockets, a centrally-located chamber or drum with which the pockets communicate at one end and composed of a series of staves, a tongue connecting the staves at their joints and extending lengthwise of the drum between the openings in the staves through which the tubes or pockets have communication with the drum, and serving to prevent leakage of air at the joints in the event of shrinkage of the staves, and bands passed circumferentially around the drum between the radially-arranged tubes or sockets and secured to the staves, substantially as described.

6. In an air-purifier, a series of radially-arranged collecting tubes or pockets, a centrally-located chamber or drum with which the tubes or pockets communicate at one end, rotatable beaters located to operate between the collecting tubes or pockets and to contact therewith, and means for rotating said beaters, substantially as described.

7. In an air-purifier, a series of radially-arranged collecting tubes or pockets, a centrally-located chamber or drum with which the pockets communicate at one end, a beater extending longitudinally of the pockets and arranged to contact therewith through the greater part of the length of the pockets, and located to permit the pockets to travel past the beater while the beater lies between the pockets, substantially as described.

8. In an air-purifier, a series of radially-arranged collecting tubes or pockets, a centrally-located chamber or drum with which the pockets communicate at one end, beaters arranged to operate between said dust-collecting tubes or pockets and comprising centrifugally-operating members adapted to contact with said tubes or pockets, and means for operating said beaters, substantially as described.

9. In an air-purifier, a series of radially-arranged collecting tubes or pockets, a centrally-located chamber or drum with which the pockets communicate at one end, rotatable shafts arranged in line with the spaces between the dust-collecting tubes or pockets, members having a yielding connection with said shafts and adapted to contact with said tubes or pockets, and means for rotating said shafts, substantially as described.

10. In an air-purifier, a series of radially-arranged collecting tubes or pockets, a centrally-located chamber or drum with which the pockets communicate at one end, sleeves carried by a suitable support, shafts passing through said sleeves so as to rotate therein and provided with members arranged to contact with the dust-collecting tubes or pockets, means for sustaining said shafts from said sleeves, and means for rotating said shafts, substantially as described.

11. In an air-purifier, a series of radially-arranged collecting tubes or pockets, a centrally-located chamber or drum with which the pockets communicate at one end, a bracket-support carrying a series of sleeves, rotatable shafts journaled in and supported from said sleeves, members yieldingly connected with said shafts and arranged to contact with the dust-collecting tubes or pockets upon rotation of the shafts, and means for rotating the shafts, substantially as described.

12. In an air-purifier, a series of radially-arranged collecting tubes or pockets, a centrally-located chamber or drum with which the pockets communicate at one end, a bracket-support carrying a series of sleeves, rotatable shafts journaled in and supported from said sleeves and provided with yielding members adapted to contact with the dust-collecting tubes or pockets, pinions secured to said shafts, and a driving-shaft provided with gears meshing with the pinions on the shafts which carry the members to contact with the dust-collecting tubes or pockets, substantially as described.

13. In an air-purifier, a series of radially-arranged collecting tubes or pockets, a centrally-located chamber or drum with which the tubes or pockets communicate at one end, a conveyer-trough located in the upper part of the drum, wings extending to each side of the conveyer-trough between it and the portion of the drum above the trough, said wings having a free up-and-down movement independent of the trough and a tongue-and-groove connection with the trough where the top edge of the trough and under face of the wings join each other, and springs bearing at one end against said wings and at the opposite end against a suitable support so as to exert a yielding pressure against the wings, substantially as described.

In testimony whereof I affix my signature in presence of two witnesses.

FAUSTIN PRINZ.

Witnesses:
   W. F. FILTER,
   GERHARD G. FISCHER.